United States Patent [19]

Suzuki

[11] 3,973,796
[45] Aug. 10, 1976

[54] OPERATOR'S CAB IN A CONSTRUCTION VEHICLE

[75] Inventor: Yasuo Suzuki, Hirakata, Japan

[73] Assignee: Kabushiki Kaisha Komatsu Seisakusho, Tokyo, Japan

[22] Filed: Mar. 3, 1975

[21] Appl. No.: 555,038

[30] Foreign Application Priority Data
Apr. 9, 1974   Japan.................................. 49-39425
Apr. 9, 1974   Japan.................................. 49-39426

[52] U.S. Cl........................... 296/28 C; 296/35 R; 296/102
[51] Int. Cl.²........................................ B62D 27/04
[58] Field of Search............. 296/28 C, 35 R, 35 A, 296/102; 280/150 C; 248/15, 20, 21; 206/521; 214/DIG. 1

[56] References Cited
UNITED STATES PATENTS
| 363,378 | 5/1887 | Fay...................................... 105/453 |
| 3,690,607 | 9/1972 | Mard..................................... 248/20 |
| 3,690,720 | 9/1972 | Whisler............................. 296/35 R |

FOREIGN PATENTS OR APPLICATIONS
| 493,219 | 10/1958 | United Kingdom................. 64/11 F |
| 1,170,240 | 11/1969 | United Kingdom............... 296/28 C |
| 110,192 | 4/1940 | United Kingdom.............. 296/35 R |
| 323,178 | 1/1930 | United Kingdom................ 64/11 F |

Primary Examiner—L. J. Paperner
Assistant Examiner—Donald W. Underwood
Attorney, Agent, or Firm—Armstrong, Nikaido & Wegner

[57] ABSTRACT

Operator's cab in a construction vehicle having a pair of front upstanding posts and a pair of rear upstanding posts secured to the chassis of the vehicle. Either one of the forward and the rearward upper side of the cab is forwardly and rearwardly as well as leftwardly and rightwardly swingably supported by either one pair of the pairs of posts while the other of the forward and the rearward upper side of the cab is cushioningly supported by the other pair of the pairs of posts so that the cab is supported by the chassis without transmitting vibrations and impacts from the vehicle to the cab.

4 Claims, 9 Drawing Figures

OPERATOR'S CAB IN A CONSTRUCTION VEHICLE

BACKGROUND OF THE INVENTION

The present invention relates to an operator's cab in a construction vehicle.

Heretofore, an operator's cab in a construction vehicle such as a bulldozer has been mounted on the chassis of the vehicle with or without cushioning means interposed therebetween. Therefore, vibrations and impacts caused by the vibrating bodies such as the engine, the pump, the transmission and the torque converter arranged in the vehicle or transmitted from the exterior of the vehicle are applied to the operator's cab, thereby raising the noise level in the cab while the comfortable feeling of the operator in the cab is widely deteriorated by the vibrations and impacts applied to the cab.

The present invention aims at avoiding the above described difficulties in the prior art construction vehicle.

SUMMARY OF THE INVENTION

An object of the present invention is to provide a novel and useful construction of the operator's cab in a construction vehicle which avoids the above described difficulties of the prior art.

Another object is to provide a novel and useful construction of the operator's cab in a construction vehicle which reduces the vibrations and impacts applied to the operator's cab from the vehicle or the exterior of the vehicle while the noise level is widely reduced so as to improve the comfortable feeling of the operator in the operator's cab.

The above objects are achieved in accordance with the present invention by the provision of an operator's cab in a construction vehicle which is characterized by first suspension means connected to one of a pair of front upstanding posts and a pair of rear upstanding posts secured to the chassis of the vehicle for forwardly and rearwardly as well as leftwardly and rightwardly swingably supporting one of the forward and rearward upper sides of the cab and second suspension means connected to the other pair of the pairs of posts for cushioningly supporting the other of the forward and rearward upper sides of the cab, so that the cab is cushioningly supported by the chassis without transmitting vibrations and impacts to the operator's cab.

In accordance with another feature of the present invention, support means having cushioning members may be connected between the lower side of the cab at the side of the other of the forward and rearward upper sides thereof and the chassis, so that the cab is cushioningly supported through the support means by the chassis in addition to the first and second suspension means.

DETAILED DESCRIPTION OF THE PREFERRED EMBODIMENTS

Figure 1:
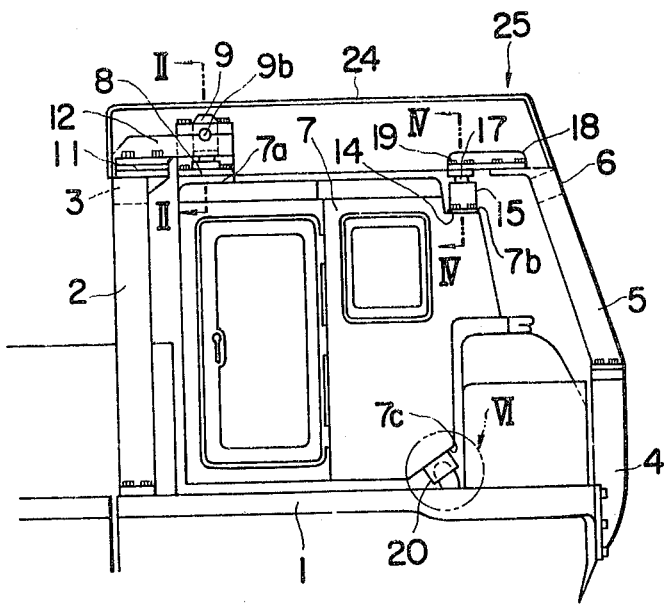
FIG. 1 is a general side view showing the operator's cab in a construction vehicle constructed in accordance with the present invention.
Figure 2:
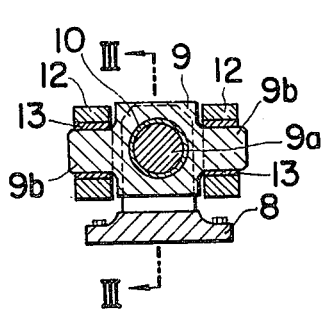
FIG. 2 is a sectional view taken along line II — II in FIG. 1 and showing the universal joint incorporated in the first suspension means.
Figure 3:
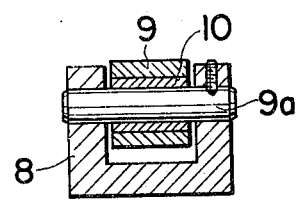
FIG. 3 is a cross-sectional side view taken along line III — III in FIG. 2.
Figure 4:
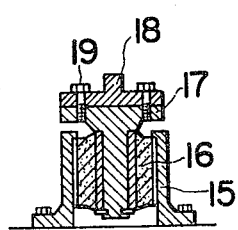
FIG. 4 is a sectional view taken along line IV — IV in FIG. 1.
Figure 5:
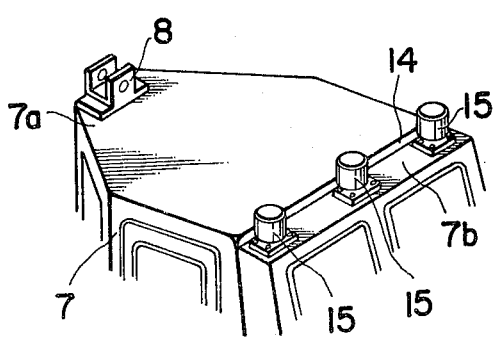
FIG. 5 is a perspective view showing the upper portion of the operator's cab of FIG. 1.

Referring now to FIG. 1, the chassis 1 of the construction vehicle has a pair of front upstanding posts secured to the left and right sides of the chassis 1, respectively, and a pair of mounting members 4 secured to the left and right sides of the chassis 1 at the rear end thereof, respectively.

A pair of rear upstanding posts 5 are secured at their lower ends to the upper ends of the mounting members 4, respectively.

A transverse member 3 is secured at its opposite ends to the upper ends of the posts 2, respectively, while a transverse member 6 is secured at its opposite ends to the upper ends of the posts 5, respectively.

The operator's cab 7 is in the form of a box which can be arranged between the posts 2, 5 as shown in FIG. 1.

A bracket 8 is secured at the center of the front upper side 7a of the cab 7, and a universal joint 9 comprising axles 9a, 9b extending perpendicularly to each other is arranged in the bracket 8 with the axle 9a being journaled in the bores of the bracket 8 through bearing sleeves 10 of synthetic resin or nylon interposed therebetween. A support arm 12 is secured to the transverse member 3 through a cushioning member 11, and the other axle 9b is journaled in the bores formed in the support arm 12 through bearing sleeves 13 of synthetic resin or nylon, so that the cab 7 is forwardly and rearwardly as well as leftwardly and rightwardly swingably supported with respect to the chassis by the universal joint.

A stepped portion 14 is formed at the rear upper side of the cab 7 so as to provide a lowered rear portion 7b. Three cylindrical members 15 are secured to the lowered rear portion 7b at equally spaced positions from each other and support shafts 17 are resiliently supported in the cylindrical members 15 through cushioning members 16, respectively. The support shafts 17 are secured to mounting plates 18 by means of bolts 19, respectively, the mounting plates 18 being in turn secured to the transverse member 16. Thus, the rear portion 7b of the cab 7 is cushioningly supported by the mounting plates 18 secured to the chassis 1 through the posts 5 and the mounting members 4.

The rearward lower edge of the cab 7 is formed with an inclined surface 7c and box-like bracket 20 is bolted to the inclined surface 7c. Support bracket 21 is secured to the chassis 1 and the bracket 21 extends into the box-like bracket 20.

A pair of cushioning bodies 22, 22 are secured to the front and rear inner walls 20a, 20a of the box like bracket 20 so that they shiftably and resiliently abut against the front and rear end walls 21a, 21a formed in the support bracket 21, respectively, while a pair of cushioning bodies 23, 23 are secured to the left and right inner walls 20b, 20b of the box-like bracket 20 so that they shiftably and resiliently abut against the left and right surfaces 21b, 21b formed in the support bracket 21. Thus, the rearward lower edge of the cab 7 is swingably supported by the chassis 1 through the brackets 20, 21.

A cover 24 in the inverted U-form straddles the front and rear transverse members 3, 6 and is secured thereto so as to protect the cab 7 as shown in FIG. 1. The cover 24 together with the front and rear posts 2, 5 forms the cab guard 25.

Figure 6:
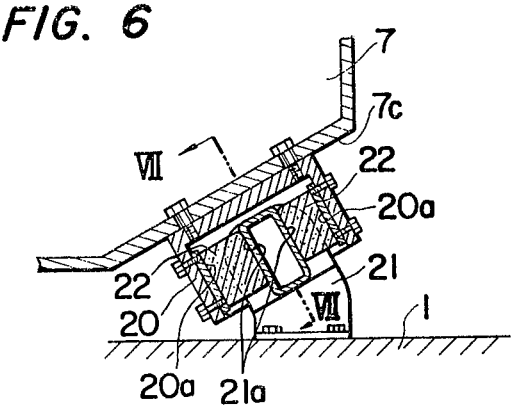
FIG. 6 is a sectional view in enlarged scale showing the portion encircled by a circle VI in FIG. 1.
Figure 7:
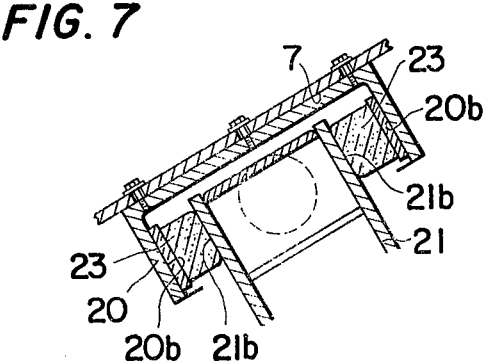
FIG. 7 is a sectional view taken along line VII — VII in FIG. 6.
Figure 8:
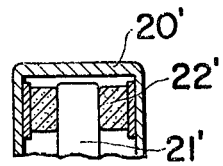
FIG. 8 is a longitudinal sectional view showing an alternative form of the support means shown in FIG. 6.
Figure 9:
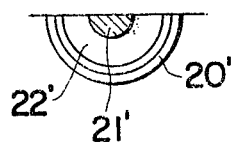
FIG. 9 is a cross-sectional view of FIG. 8.

FIGS. 8 and 9 show an alternative form of the brackets 20, 21 shown in FIGS. 6 and 7. A cylindrical member 20' shown in FIG. 8 is secured to the inclined surface 7c of the cab 7 in place of the bracket 20 of FIG. 6 and the support bracket 21 of FIGS. 6 and 7 is substituted by a rod 21' secured to the chassis 1. An annular cushioning member 22' is secured to the inner wall of the cylindrical member 20' and the cushioning member 22' is adapted to shiftably and resiliently abut against around the rod 21', thereby permitting the cylindrical member 20' to be cushioningly supported by the rod 21'.

With the operator's cab 7 constructed as described above, the vibrations and impacts transmitted to the cab guard 25 from the chassis 1 are absorbed by the cushioning member 11 and the cushioning members 16 so as to reduce the vibration and impact applied to the cab 7, while the cab 7 is swung forwardly and rearwardly as well as leftwardly and rightwardly with respect to the chassis 1 by means of the universal joint 9 including the cross axles 9a, 9b when external force is applied to the cab 7 from the vehicle so that the vibration and impact applied to the cab 7 are damped by means of the cushioning members. Therefore, the comfortable feeling of the operator in the cab 7 is insured while the noise in the cab is widely reduced.

Further, since the rearward lower portion of the cab 7 is cushioningly supported by the chassis by means of cushioning members 22, 23 or the cushioning member 22', the cab 7 is positively supported by the chassis 1 without excessively vibrated in the vehicle.

I claim:

1. An operator's cab in a construction vehicle having a chassis and a pair of front upstanding posts and a pair of rear upstanding posts, both the pairs of posts being respectively secured in the chassis of said vehicle, and further comprising:

a. a first suspension means for forwardly and rearwardly as well as leftwardly and rightwardly swingably supporting one side of the forward and rearward upper sides of said cab and which has a universal joint with axles extending perpendicularly to each other, one of said axles being pivotally connected to one pair of said pairs of posts, while the other axle is pivotally connected to one of the said forward and rearward upper sides of said cab, and b. a second suspension means for cushioningly supporting the other of said upper sides of said cab which has a plurality of cylindrical members, each cylindrical member having a first end secured to the other upper side of said cab, a plurality of support shafts, each shaft having a first end received by a second end of a respective cylindrical member and being resiliently supported in the respective cylindrical member and each shaft having a second end secured to the other pair of posts, and cushioning members interposed between each of said cylindrical members and each of said support shafts, whereby said cab is forwardly and rearwardly as well as leftwardly and rightwardly cushioningly supported by said chassis.

2. An operator's cab as set forth in claim 1, further comprising support means for cushioningly supporting the lower end of said cab at the side corresponding to the said other upper side of said cab, said support means being cushionably connected to said chassis.

3. An operator's cab as set forth in claim 2, wherein said support means comprises a box-like member secured to the lower end of said cab at the side corresponding to the said other side of said cab, support brackets secured to said chassis and extending into the interior of said box-like member, and cushioning members arranged around said support brackets for cushioningly supporting said box-like member.

4. An operator's cab as set forth in claim 2 wherein said support means comprises a cylindrical member secured to the lower end of said cab at the side corresponding to the said other upper side of said cab, a support rod secured to said chassis and extending into the interior of said cylindrical member, and a cushioning member arranged around said support rod for cushioningly supporting said cylindrical member of the support means.

* * * * *